(12) United States Patent
Sonehara

(10) Patent No.: US 6,606,138 B2
(45) Date of Patent: *Aug. 12, 2003

(54) LIQUID CRYSTAL LAYER INCLUDING A DICHROIC DYE

(75) Inventor: Tomio Sonehara, Nagano-ken (JP)

(73) Assignee: Seiko Epson Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,078

(22) PCT Filed: May 22, 1997

(86) PCT No.: PCT/JP97/01753
§ 371 (c)(1),
(2), (4) Date: Jan. 22, 1998

(87) PCT Pub. No.: WO97/44701
PCT Pub. Date: Nov. 27, 1997

(65) Prior Publication Data
US 2002/0005930 A1 Jan. 17, 2002

(30) Foreign Application Priority Data
May 22, 1996 (JP) ............................................. 8-127546

(51) Int. Cl.[7] ............................................. G02F 1/1335
(52) U.S. Cl. ........................ 349/113; 349/165; 349/117
(58) Field of Search ................................ 349/113, 165, 349/112, 117

(56) References Cited

U.S. PATENT DOCUMENTS

| | | | | | |
|---|---|---|---|---|---|
| 4,266,859 A | * | 5/1981 | Togashi | ...................... | 349/165 |
| 4,505,546 A | * | 3/1985 | Umeda et al. | .............. | 349/165 |
| 5,307,185 A | * | 4/1994 | Jones et al. | ................. | 349/165 |
| 5,327,271 A | * | 7/1994 | Takeuchi et al. | .............. | 349/86 |
| 5,686,017 A | * | 11/1997 | Kobayashi et al. | ........... | 349/86 |
| 5,699,135 A | * | 12/1997 | Hisatake et al. | ............ | 349/113 |
| 5,742,368 A | * | 4/1998 | Chen | .......................... | 349/113 |
| 5,760,860 A | * | 6/1998 | Mason et al. | ................. | 349/86 |
| 6,016,178 A | * | 1/2000 | Kataoka et al. | ............. | 349/106 |

FOREIGN PATENT DOCUMENTS

| | | |
|---|---|---|
| JP | 61-179531 | 11/1986 |
| JP | 63-116122 | 5/1988 |
| JP | 7-28035 | 1/1995 |
| JP | 7-43730 | 2/1995 |

* cited by examiner

Primary Examiner—Toan Ton
(74) Attorney, Agent, or Firm—Harness, Dickey & Pierce, P.L.C.

(57) ABSTRACT

A reflecting film is formed on one substrate, and ¼ wavelength layer is arranged on this reflecting film. A liquid crystal layer comprises liquid crystal molecule, a polymer and dichroic dye, the polymer particles being dispersed in liquid crystal molecules. Using this configuration, a liquid crystal apparatus free from parallax is available. Because the dichroic dye is mixed in the liquid crystal layer, a light entering the liquid crystal layer upon non-application of voltage is absorbed by the dichroic dye, thus giving a light absorbing state. Upon application of voltage, there is available a light scattering state.

24 Claims, 8 Drawing Sheets

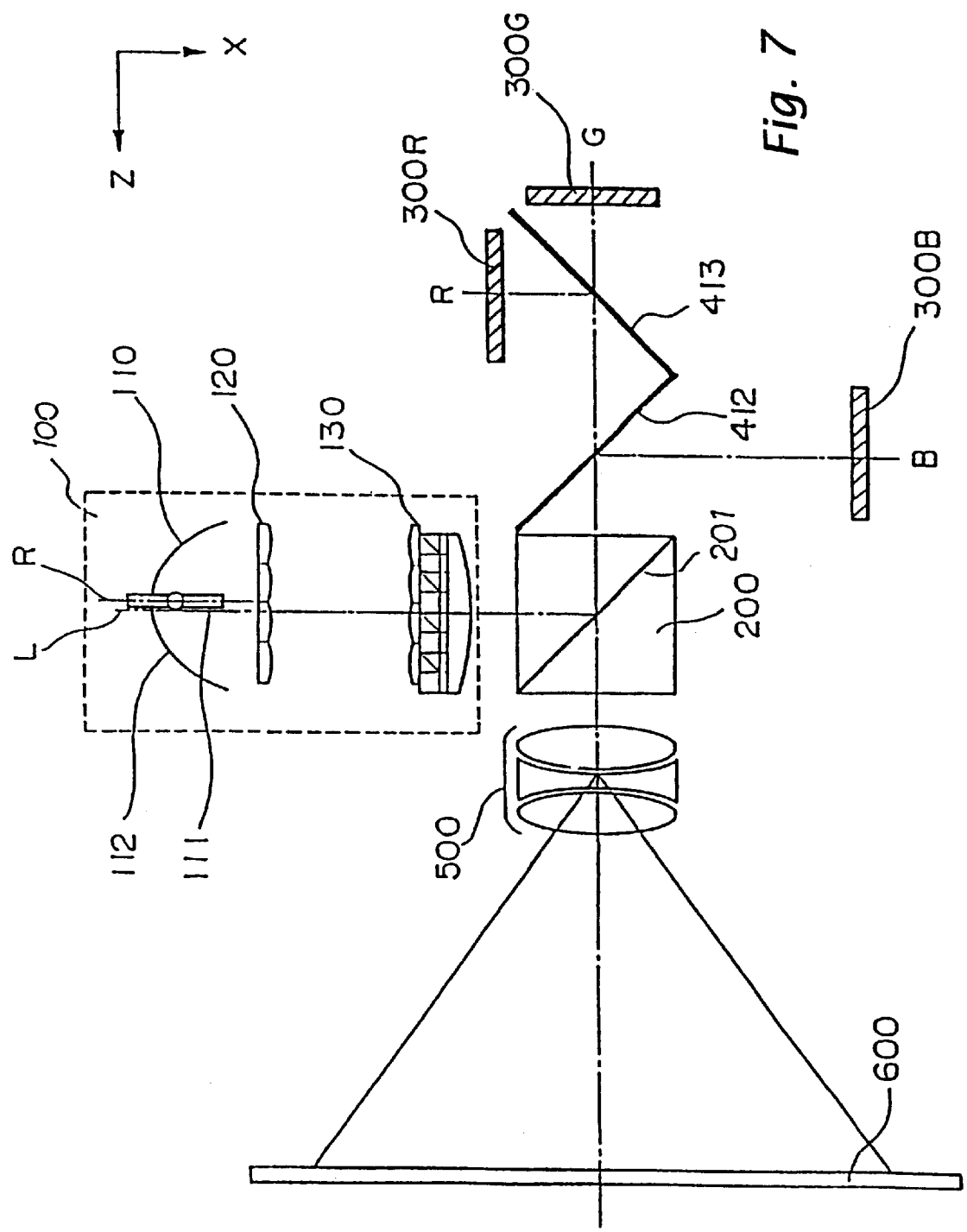

LIQUID CRYSTAL LAYER INCLUDING A DICHROIC DYE

TECHNICAL FIELD

The present invention relates to a liquid crystal apparatus and more particularly, to a liquid crystal apparatus having a liquid crystal layer comprising a polymer dispersed in a liquid crystal molecule.

BACKGROUND ART

A reflection type liquid crystal display unit has conventionally a configuration in which a liquid crystal panel is arranged between a pair of polarization plates and reflector is arranged on one of substrates. However, because of the necessity of using a polarization plate, the conventional reflection type liquid crystal display unit suffers much loss of light, resulting in a very dark display.

There is available, on the other hand, a polymer dispersion type liquid crystal display unit having a liquid crystal layer comprising a liquid crystal molecule and a polymer, as a liquid crystal apparatus of a type not using a polarization plate. This polymer dispersion type liquid crystal display unit performs display by the utilization of a light transmission state and a light scattering state. When mixing a dichroic dye in the liquid crystal layer of such a polymer dispersion type liquid crystal display unit, display is accomplished by a light absorbing state and a light scattering state.

The liquid crystal display unit of such a configuration has however a problem in that light absorption by the dichroic is insufficient in the voltage non-applied state.

In a liquid crystal display unit of the polymer dispersion type, in which a ¼ wavelength plate and a reflector is arranged on the outside of one of substrates, the light passes therethrough in the following sequence.

After the light having entered the liquid crystal display unit from outside passes through one of the substrates, the light passes through the liquid crystal layer. Then, after passing through the other substrate, the light passes through the ¼ wavelength plate and is reflected on the reflector. The reflected light passes again through the ¼ wavelength plate, passes sequentially through the other substrate, the liquid crystal layer and the first substrate, and is emitted outside the liquid crystal apparatus. This conventional polymer dispersion type liquid crystal display unit has a problem in that, because of a distance between an electrode formed within the substrate and the reflector formed on the outside of the substrate, a parallax is present in a display of the liquid crystal display unit.

DISCLOSURE OF INVENTION

A main object of the present invention is to provide a liquid crystal apparatus of a high contrast rates, which improves parallax in the liquid crystal apparatus and gives a higher light absorption caused by a dichroic dye.

In a preferred embodiment of the liquid crystal apparatus of the invention:
  a liquid crystal layer comprises a liquid crystal molecule, a polymer an a dichroic dye and held between a pair of substrates; a reflection layer is formed on one of the substrates on one of the substrates on the such having the liquid crystal layer formed thereon; and a retardation film is formed on the reflection layer.

This configuration makes it possible to obtain a light absorbing state by the dichroic dye upon non-application of voltage, and a light scattering state upon application of voltage. The retardation film (¼ wavelength layer) formed in the liquid crystal apparatus converts the light reflected on the reflector into a light having a polarization component in a prescribed direction. The light is therefore absorbed by the dichroic dye contained in the liquid crystal layer through which the light passes again. In addition, also upon application of voltage, the light reflected on the reflector is converted into a light having a prescribed direction by the retardation film, and scattered in the liquid crystal layer through which it passes again. More specifically, the light can be scattered due to the difference in refractive index between the liquid crystal molecule and the polymer.

It is therefore possible to increase the extent of absorption in the light absorption state, and at the same time, to increase the degree of light scattering in the light scattering state. There is thus available a liquid crystal apparatus having an improved contrast.

Under the effect of the configuration in which an electrode is formed on the retardation film and another electrode is formed on the other substrate, there is available, upon non-application of voltage, the light absorption state of the liquid crystal apparatus by the arrangement of the liquid crystal molecule, the polymer and the dichroic dye in substantially the same direction. Upon application of voltage, the liquid crystal molecule and the dichroic dye are arranged in the electric field direction, thus making it possible to obtain a light scattering state of the liquid crystal apparatus.

In a preferred embodiment of the liquid crystal apparatus of the invention:
  a liquid crystal layer comprising a liquid crystal molecule, a polymer and a dichroic dye in held between a pair of substrates; a reflecting layer is formed on a substrate on the side having the liquid crystal layer formed thereon; a retardation film is formed on the reflecting layer; and an electrode is formed on the retardation film.

This configuration makes it available a light absorption state by the dichroic dye upon non-application of voltage, and a light scattering state upon application of voltage.

Further, arrangement of the retardation film (¼ wavelength layer) permits conversion of the light reflected on the reflecting layer into a light having a prescribed polarization component. Upon non-application of voltage, the light is absorbed by the dichroic dye, and upon application of voltage, it is possible to increase the contrast ratio between voltage non-application and application states.

The configuration, in which a pixel electrode is formed in a matrix shape on the retardation film, and a switching element connected to the pixel electrode is formed, makes it available a liquid crystal apparatus of a clear image display because of the possibility of controlling the state of the liquid crystal for each picture element.

It is possible to adopt a configuration in which an optical isotropic layer not producing an optical action is formed between the retardation film and the liquid crystal layer. It is also possible to obtain a liquid crystal apparatus capable of color display in a configuration in which a color filter comprising a plurality of color elements is formed on the other substrate at a position opposite to the pixel electrode. A color filter having red, blue and green color elements or a color filter having yellow, magenta and cyan color elements may be used, and a clear image display is available.

In a preferred embodiment of the liquid crystal apparatus of the invention:
  a liquid crystal layer comprising a liquid crystal molecule, a polymer and a dichroic dye is held between a pair of substrates; an electrode having a reflecting property is formed on one of substrates on the side having the liquid crystal layer formed thereon; and a retardation film is formed on the electrode.

In this configuration, it is possible to form the electrode directly on the substrate, and to simplify the manufacturing process without the necessity to separately form the reflecting film and the electrode. Upon non-application of voltage, a light absorbing state is obtained from the dichroic dye, and upon application of voltage, there is available a light scattering state. Further, by providing a retardation film (¼ wavelength layer), it is possible to convert the light reflected on the reflecting layer into a light having a prescribed polarization component. Therefore, upon non-application of voltage, the light is absorbed by the dichroic dye, and upon application of voltage, the light is scattered, thus enabling to increase the contrast ratio between non-application and application of voltage.

By using a configuration in which the electrode comprises a plurality of pixel electrodes arranged in a matrix shape, and switching elements connected to the pixel electrodes are formed, it is possible to control voltage to be applied onto the liquid crystal for each picture element and to control the state of the liquid crystal layer for each picture element, thus permitting obtaining a liquid crystal apparatus displaying a high-quality image. It is also applicable as a light valve.

By adopting a configuration in which a color filter comprising a plurality of color elements is formed on the other substrate, there is available a liquid crystal apparatus capable of performing color display.

In a preferred embodiment of the liquid crystal apparatus of the invention:

pixel electrodes formed into a matrix shape and switching elements connected to the pixel electrodes are formed on the substrate on the light incidence side; a reflecting layer and a retardation film are formed on the substrate opposite thereto; and the liquid crystal layer comprises a liquid crystal, a polymer and a dichroic dye. A highly accurate liquid crystal apparatus is available also with this configuration.

Since the present invention covers a reflection type liquid crystal apparatus which does not require use of a light source (known as a back light), liquid crystal apparatus of a low power consumption is available. Further, because this is a liquid crystal apparatus of a mode not requiring the use of a polarization plate, a liquid crystal apparatus of a bright display is obtained.

By mounting a liquid crystal apparatus having any of the foregoing configurations on an electronic equipment, it is possible to obtain an electronic equipment of a low power consumption is available, and this is particularly useful for a portable electronic equipment.

For example, it is possible to mount the liquid crystal apparatus as a light valve, and mount the same as a display unit of the invention onto the display section of a portable electronic equipment.

BRIEF DESCRIPTION OF DRAWINGS

FIG. 7 illustrates the structure of an electronic equipment using the liquid crystal apparatus as a light valve.

BEST MODE FOR CARRYING OUT THE INVENTION

To solve the foregoing problems, the liquid crystal apparatus of the invention has the following configuration.

First Embodiment

Figure 1:
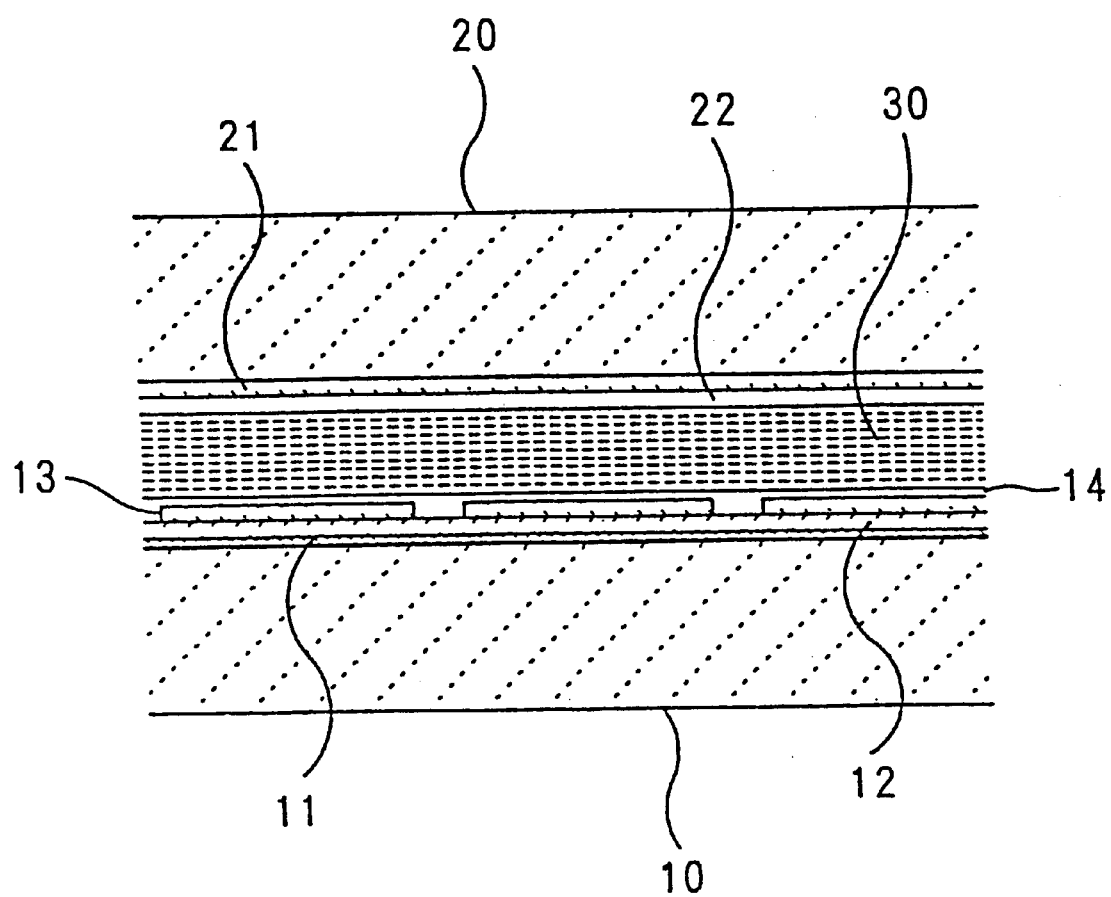
FIG. 1 is a longitudinal sectional view illustrating an embodiment of the liquid crystal apparatus of the present invention.

The configuration of the liquid crystal apparatus of the invention will be described below with reference to FIG. 1. In this embodiment, application as a display unit, i.e., a liquid crystal display unit will be described.

The liquid crystal display unit comprises a liquid crystal layer (30) held between a pair of substrates (10 and 20). A transparent electrode 21 comprising ITO is formed on a glass substrate 10 and an alignment film 22 is formed on the electrode 21.

The transparent electrode 21 formed on the inner surface of the substrate 20 is formed into a prescribed shape. A rubbing treatment is applied to the surface of the alignment film 22 formed on the electrode 21.

The substrate 10 opposite to the substrate 20 comprises, on the other hand, a glass substrate, and a reflecting layer 11 is formed on the inner surface of the substrate. A ¼ wavelength layer 12 is formed on the reflecting layer 11, and a transparent electrode 13 is formed on the ¼ wavelength layer. An alignment film is formed on the electrode. The reflecting layer formed on the inner surface of the substrate 10 by sputtering of a metal such as aluminum or chromium.

The foregoing ¼ wavelength layer 12 comprises a material expressed, for example, by the following chemical formula:

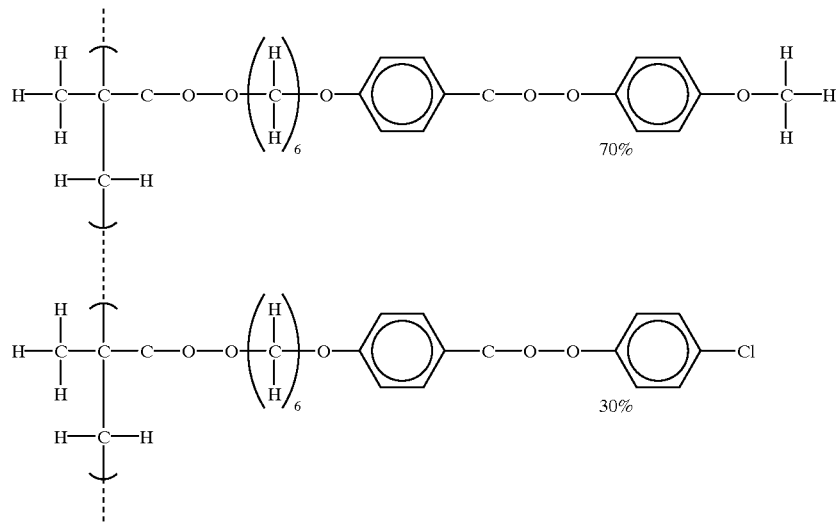

The ¼ wavelength layer 12 is formed in compliance with the chemical formula 1 as follows.

The process comprises the steps of forming a polyimide film on the reflecting layer 11, subjecting this polyimide to a rubbing treatment, dropping a toluene solution (solid concentration: 19%, see the following chemical formula 1) of a side-chain type liquid crystal polymer having a methacryl chain, and forming a uniform film thickness by spin coating at revolutions of 200 rpm, thereby obtaining a liquid crystal polymer having a thickness of about 6 $\mu$m. Thereafter, the formed film is heated at 48 C. for three hours for heating orientation.

ITO (indium-tin oxide) is formed by sputtering on the surface of the ¼ wavelength layer. An electrode 13 is formed by patterning the same into a prescribed shape.

An alignment film 14 formed on this electrode 13 is made of polyimide.

An alignment film 14 formed on the surface of the electrode 13 is made of polyimide. More particularly, polyimide was coated and the resultant polyimide coat was heated and set to form the alignment film 14. The alignment film 14 has a rubbing-treated surface. The direction of rubbing applied to the alignment film 14 was at substantially 45 to the rubbing direction for the aforesaid polyimide thin film (a polyimide thin film for causing orientation of the foregoing ¼ wavelength layer 12).

By arranging a pair of substrates to have the alignment film 14 and 22 face each other, a liquid crystal cell is formed. The pair of substrates are stuck to each other by a sealing agent. The substrates of this liquid crystal cell have a gap of about 5 $\mu$m there between. The sealing agent is hardened by irradiating ultraviolet rays onto the thus fixed pair of substrates, and the pair of substrates are secured by the sealing agent. As described above, a seal is formed into a frame shape so as to surround a prescribed liquid crystal sealing region. An opening is provided on a portion of the sealing region. This opening serves as an injecting port of the liquid crystal. To keep a uniform gap of the substrate cell, a spacer may be provided between the substrates, or a gap member may be provided in the sealing agent.

A solution made by mutual dissolution of the liquid crystal and a polymer precursor (monomer) is injected through the aforesaid liquid crystal injecting port. Thereafter, by irradiating ultraviolet rays onto the liquid crystal cell into which the solution has been injected, the polymer precursor is polymerized, and the resultant polymer is precipitated into the solution. Thus, a liquid crystal/polymer composite layer (liquid crystal layer) in which the polymer is dispersed in the liquid crystal molecules is formed.

The liquid crystal molecules in the proximity of the substrates are arranged along the rubbing directions of the alignment films 14 and 22.

ZLI-3926 (product name; made by Merck Japan Ltd.) is used as the liquid crystal, and S-344 (product No.; made by Mitsui Toatsu.) was employed as a dichroic dye mixed up with the liquid crystal. A black dichroic dye was used in an amount of 2% relative to the quantity of the liquid crystal.

The polymer is formed through optical polymerization of the polymer precursor as described above. Ester biphenolmethacrylate was used as the polymer precursor in this embodiment. Ester biphenolmethacrylate and the aforesaid liquid crystal (a material mixed with the dichroic dye) were mixed at 100 C. in a ratio 15:85 to form the foregoing solution. This solution is injected into the liquid crystal sealing region in the liquid crystal cell. Subsequently, temperature of the solution is slowly cooled to the room temperature to cause orientation of the liquid crystal molecules and the polymer in the liquid crystal layer.

After injecting the solution, as described above, ultraviolet rays are irradiated onto the liquid crystal cell at the room temperature to cause precipitation of the polymer through photo-polymerization of the polymer precursor. As a result, the liquid crystal and the polymer (or polymer particles) are separated from each other to form a liquid crystal/polymer composite layer (liquid crystal layer) 30.

While an ultraviolet-setting material is used as a polymer in this embodiment, a thermal polymerization material may also be employed.

A liquid crystal layer in a state in which the polymer particles are dispersed in the liquid crystal molecules is thus formed. The polymer particles and the liquid crystal molecules are arranged in substantially the same direction.

FIG. 2 is a schematic view of the liquid crystal layer 30.

Figure 2A:
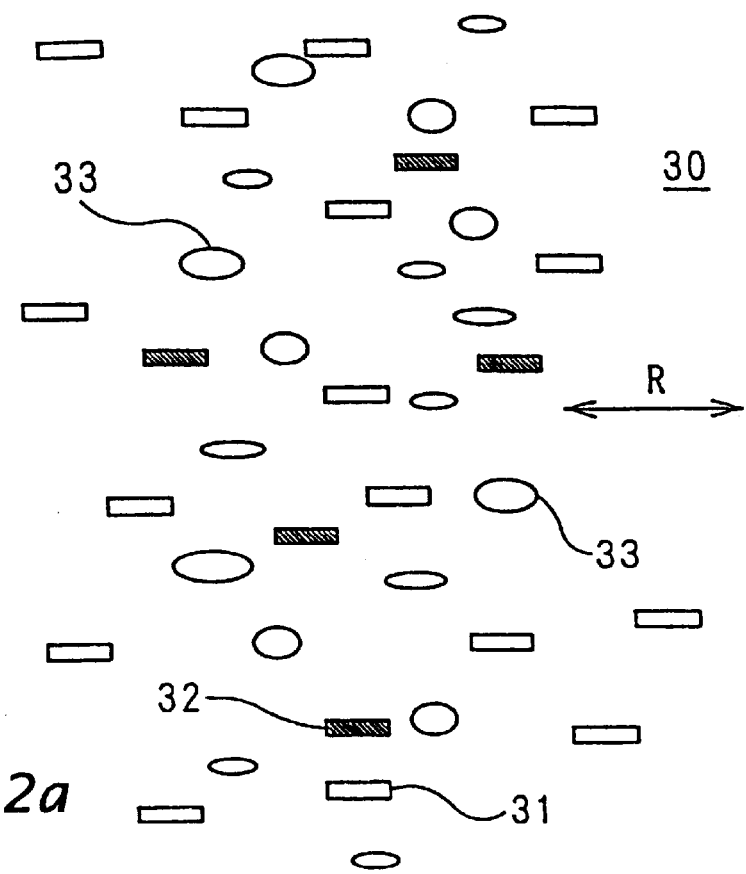
FIG. 2(a) is a schematic view illustrating a liquid crystal layer in a non-application state of electric field.

FIG. 2(a) illustrates the state of non-application of voltage. As shown in FIG. 2(a), the liquid crystal molecule 31 and the dichroic dye 32 are arranged in substantially a parallel direction to the rubbing direction (R). In other words, the liquid crystal molecule and the dichroic dye are arranged in a direction substantially in parallel with the substrate surface. The polymer is also arranged in substantially the same direction as the liquid crystal molecule.

In such a state of non-application of voltage, the liquid crystal molecule 31 and the polymer particles 33 are oriented in the same direction. Since the liquid crystal molecule 31 and the polymer particles 33 present substantially the same refractive index relative to the incident light, the liquid crystal layer in a state with almost no difference in refractive index between the liquid crystal molecule and the polymer. Therefore, under the effect of the dichroic dye oriented in almost the same direction as the liquid crystal molecule, the polarization component having an electric field oscillating direction in parallel with the molecule axis of the pigment of the incident light is absorbed by the dichroic dye, and the liquid crystal layer becomes in a light absorbing state.

Figure 2B:
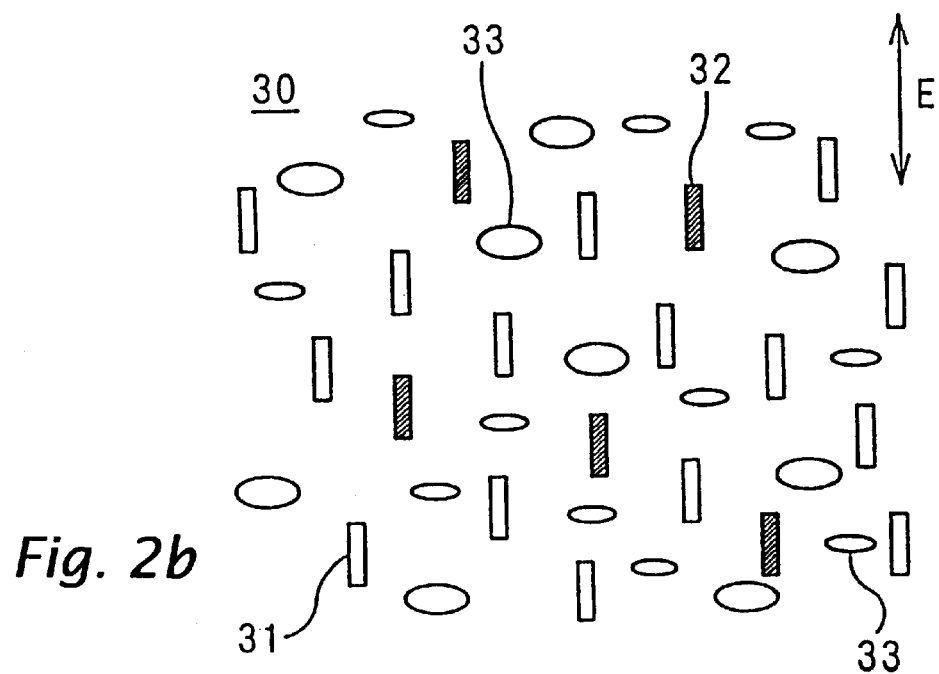
FIG. 2(b) is a schematic view illustrating a liquid crystal layer in an application state of electric field.

FIG. 2(b) illustrates, on the other hand, whether or not voltage is applied between the electrodes 13 and 21. As shown in FIG. 2(b), the liquid crystal molecule 31 and the dichroic dye 32 are oriented in the field direction E. That is, the liquid crystal molecule and the dichroic dye are oriented in a direction at right angles to the substrate surface. In this case, the refractive index relative to the incident light is different from that of the polymer particles 33 since the liquid crystal molecule 31 has a refractive index anisotropy. Under the effect of the difference in refractive index between the liquid crystal molecule and the polymer, the incident light having entered the liquid crystal layer is scattered in the liquid crystal layer. This is called the light scattering state.

The state of the liquid crystal layer upon non-application of voltage and the state thereof upon application of voltage will now be described further in detail.

Figure 3:
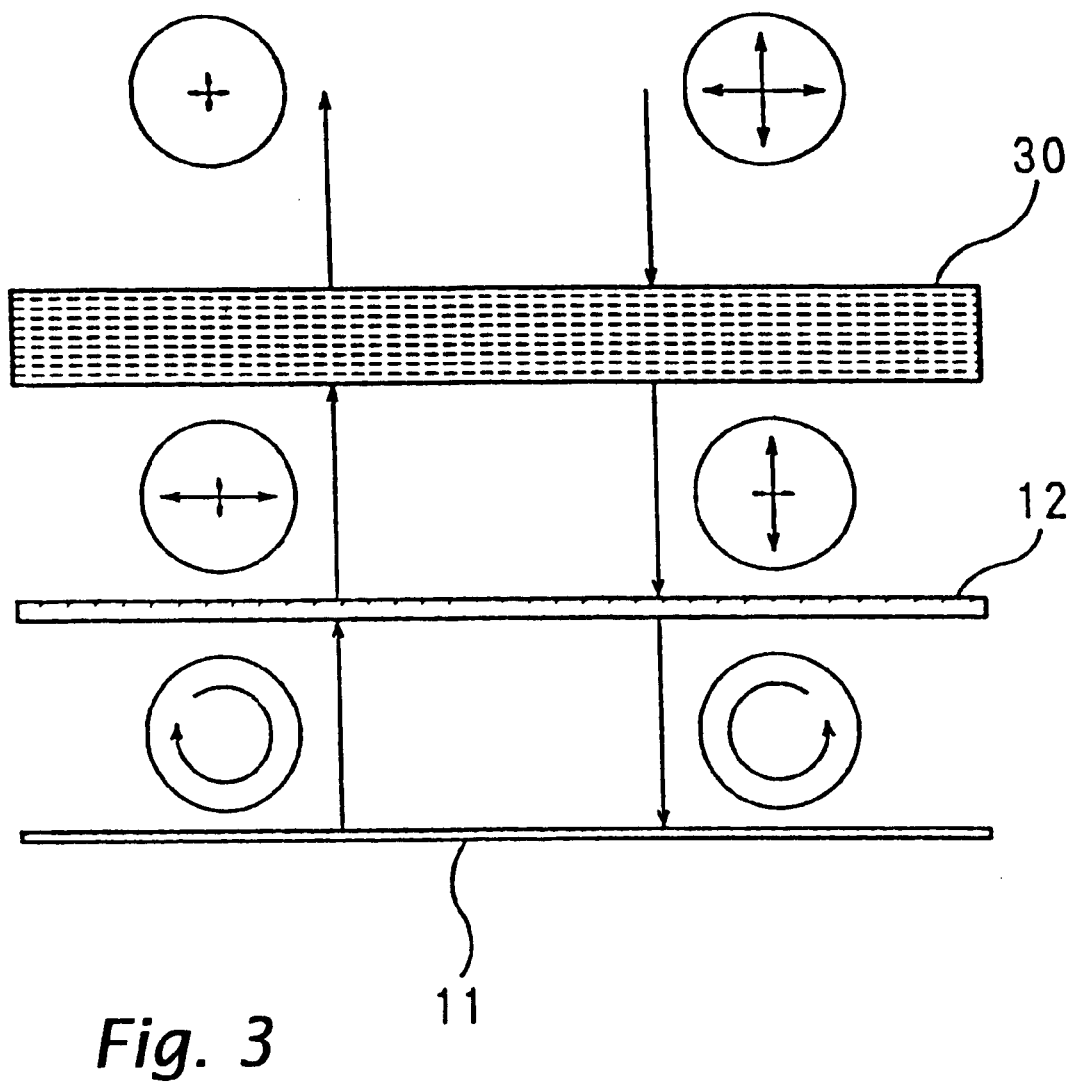
FIG. 3 illustrates the state of a light when a light entering the liquid crystal apparatus passes through various components thereof in a non-application state of electric field.

FIG. 3 illustrates the state of the liquid crystal apparatus upon non-application of voltage.

A light entering from the substrate 20 side is absorbed by the dichroic dye 32 dispersed in the liquid crystal layer 30. More specifically, the polarization component having an oscillating direction in parallel with the molecular axis of the dichroic dye of the incident light is absorbed by the dichroic dye. The light having passed through the liquid crystal layer converted into a substantially circular polarization state as shown in FIG. 3 while passing through the ¼ wavelength layer 12, and thereafter, is converted through reflection by the reflecting layer 11 into a circular polarization light rotating in the reverse direction.

The light reflected on the reflecting layer enters again the ¼ wavelength layer 12 and is converted into a light having a linear polarization component as shown in FIG. 3 by the ¼ wavelength layer 12. This linear polarization has a polarization component in a direction at right angles to the light polarization between the foregoing liquid crystal layer and the ¼ wavelength layer. The light having the polarization component is absorbed by the dichroic dye 32 in the liquid crystal layer 30 it passes through again.

In the non-application state of electric field, therefore, the light having a component in the same direction as that of the absorption axis of the dichroic dye of the light having entered from the substrate 20 side, and the light reflected on the reflecting layer are thus absorbed by the dichroic dye. In other words, the polarization component in the same direction as the light absorption axis of the dichroic dye is absorbed by the dichroic dye in the forward path upon incidence of the external light into the liquid crystal layer 30 as well as in the return path upon incidence of the light reflected on the reflecting layer into the liquid crystal layer through the ¼ wavelength layer. Display upon non-application of voltage is therefore in the light absorbing state in which the light is absorbed by the dichroic dye.

Then, upon application of electric field, the liquid crystal molecule is arranged in the electric field direction. Similarly, the dichroic dye is also arranged in the electric field direction. This state is illustrated in FIG. 4.

By applying a prescribed voltage to the liquid crystal layer, the liquid crystal molecule and the dichroic dye are arranged in the electric field direction. There occurs consequently a difference in refractive index between the liquid crystal molecule and the polymer particles. In this state, the external light (for example, natural light) entering the liquid crystal layer 30 is scattered under the effect of the difference in refractive index between the liquid crystal molecule 31 and the polymer particles 33, and only a part of the light passes through the liquid crystal layer, and the part of the light having passed through the liquid crystal layer is converted into a circular polarization by the ¼ wavelength layer 12.

Figure 4:
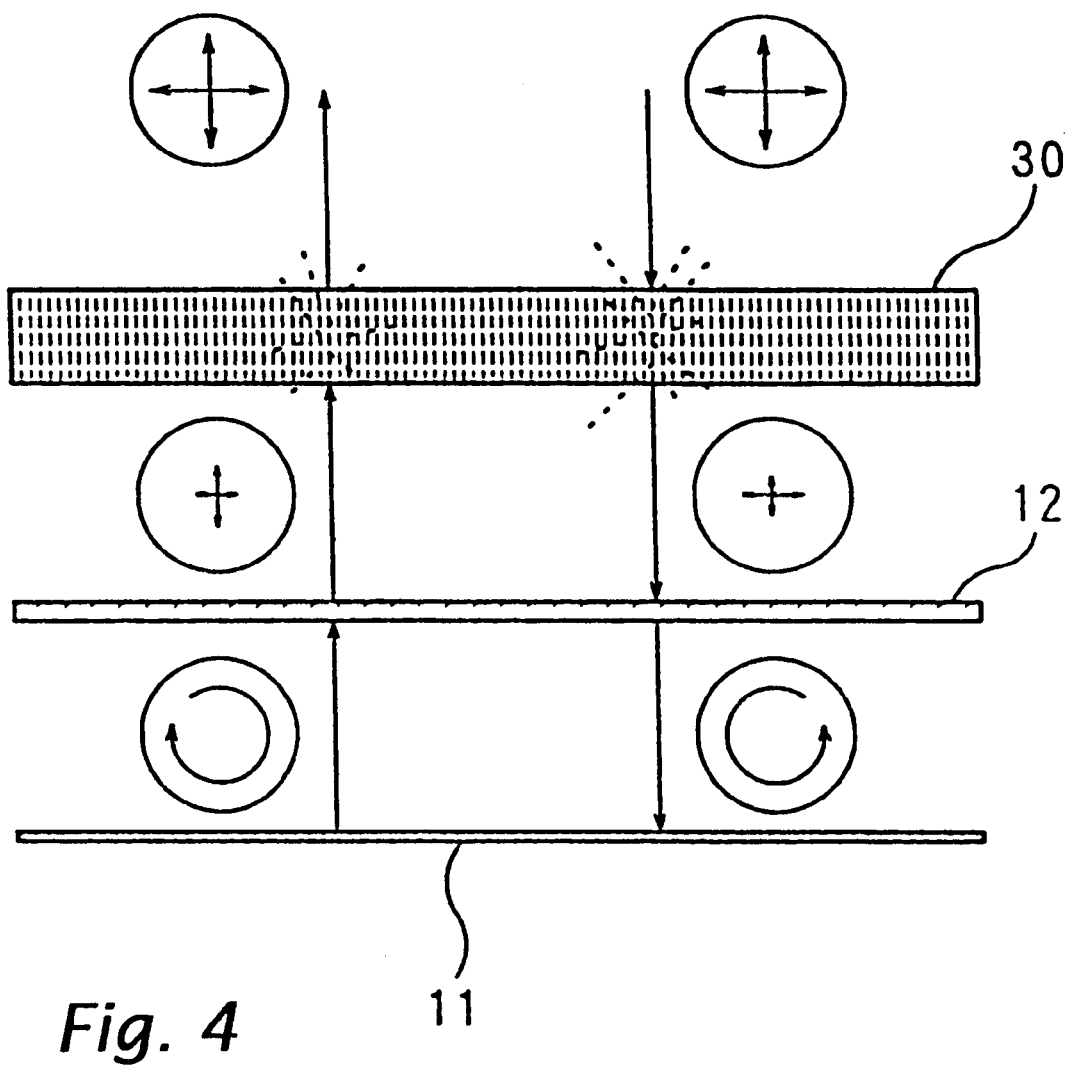
FIG. 4 illustrates the state of a light when a light entering the liquid crystal apparatus passes through various components thereof in an application state of electric field.

This circular polarization is reflected on the reflecting layer 11 and converted into a circular polarization rotating in the reverse direction as shown in FIG. 4. The reflected light passes again through the ¼ wavelength layer 12, and is converted into a prescribed state of polarization (polarization state in a direction substantially at right angles to the light having passed through the liquid crystal layer) by the ¼ wavelength layer. The thus converted light is scattered while passing again through the liquid crystal layer 30.

There is at this point conceivable a case where the polarization component having an oscillating direction in parallel with the orientation of the polymer particles, and the polarization component having an oscillating direction at right angles to the polymer particles have a similar scattering efficiency or a similar transmissivity. Even when the scattering efficiency is different between the two polarization components, they are mutually converted by the ¼ wavelength layer 12 and the reflecting layer 11 in forward and return paths, thus permitting efficient scattering.

In this embodiment, as described above, light absorption can efficiently be accomplished for a light irrespective of the direction of polarization by adjusting the light absorbing axis of the dichroic dye by means of the reflecting layer 11 and the ¼ wavelength layer 12 upon non-application of electric field, thereby making it possible to display black more strongly than in conventional art.

Upon application of electric field also, light scattering efficiency can be improved by converting the direction of polarization by means of the reflecting layer 11 and the ¼ wavelength layer 12.

When using the liquid crystal apparatus of the invention as a liquid crystal display unit, therefore, it is possible to display black more strongly upon non-application of voltage to the liquid crystal display unit, and perform light scattering to a larger extent upon application of voltage, thus permitting achievement of a far higher degree of contrast of the liquid crystal display unit than in the conventional art.

Because the ¼ wavelength layer is formed on the reflecting layer, there is available a liquid crystal display unit free from a parallax.

Further, in this embodiment, it is possible to conduct color display by arranging a color filter on the inner surface of the substrate 20 on the light incidence side.

In this embodiment, the ¼ wavelength layer has been made of the foregoing material. Any of various transparent resin coats and transparent inorganic thin film is also applicable as a ¼ wavelength layer 12.

For example, one containing an oriented polymer compound exhibiting thermotropic liquid crystal property, one containing an oriented liquid crystal monomer set by irradiating ultraviolet rays, or one having an inorganic transparent oxide film (such as $Ta_2O_5$) deposited by oblique vapor deposition on the reflecting film may be employed.

As a ¼ wavelength layer 12, a light-oriented polymer layer by polarized ultraviolet rays as disclosed in Jpn. J. Appl. Phys. Vol. 34 (1995), p. 3240 may be used.

The material for the ¼ wavelength layer formed on the reflecting layer 11 is expressed by the following chemical formula:

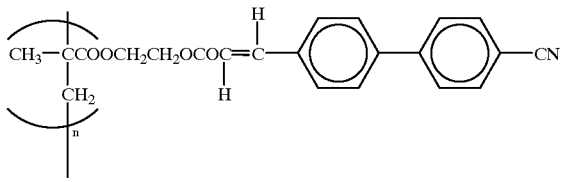

An oriented first liquid crystal polymer film is available by dropping a polymer pyrrolidone solution (solid concentration: 5%) having a polyvinyl chain with a cyanobiphenyl side chain, coating the same uniformly by spin coating at revolutions of 2,000 rpm, and irradiating polarized ultraviolet rays thereto.

Liquid crystalline diacrylate expressed by the following chemical formula 3:

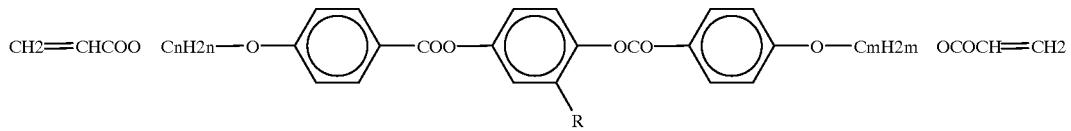

is coated on the aforesaid first liquid crystal polymer film. By irradiating ultraviolet rays onto this film for polymerization, there is available a second polymer layer governed by the orientation of the first polymer film. The second polymer layer has a thickness of about 1 µm, and serves as a ¼ wavelength layer.

The transparent electrode 13 is formed on this ¼ wavelength layer and patterned into a prescribed shape. Another light oriented polymer layer is formed on the transparent electrode by means of the side-chain type liquid crystal polymer used for forming the foregoing first oriented layer. At this point, a polarization irradiating direction is selected so that the orientation direction of the liquid crystal molecule forms an angle of about 45 relative to the orientation direction of the ¼ wavelength layer 12.

This is achievable also by attaching a sheet-shaped composite body formed by arranging the above-mentioned ¼ wavelength layer 12 on the reflecting layer 11 to the inner surface of the transparent substrate. A multi-layer sheet laminating a transparent resin sheet, a reflecting layer, and a ¼ wavelength layer may be used in place of the transparent substrate.

In this embodiment, it is possible to improve black display upon non-application of voltage in the polymer dispersion type liquid crystal display unit, and to improve contrast. In the polymer dispersion type liquid crystal unit of this embodiment performing display in the scattering mode with the liquid crystal layer comprising the dichroic dye and the ¼ wavelength layer, the ¼ wavelength layer and the reflecting layer are adjacent to the liquid crystal layer, and are arranged in the substrate. As display is accomplished by means of a light scattering state and a light absorbing state, an effect of inhibiting the decrease in the grade of display caused by parallax is available.

Second Embodiment

Figure 5:
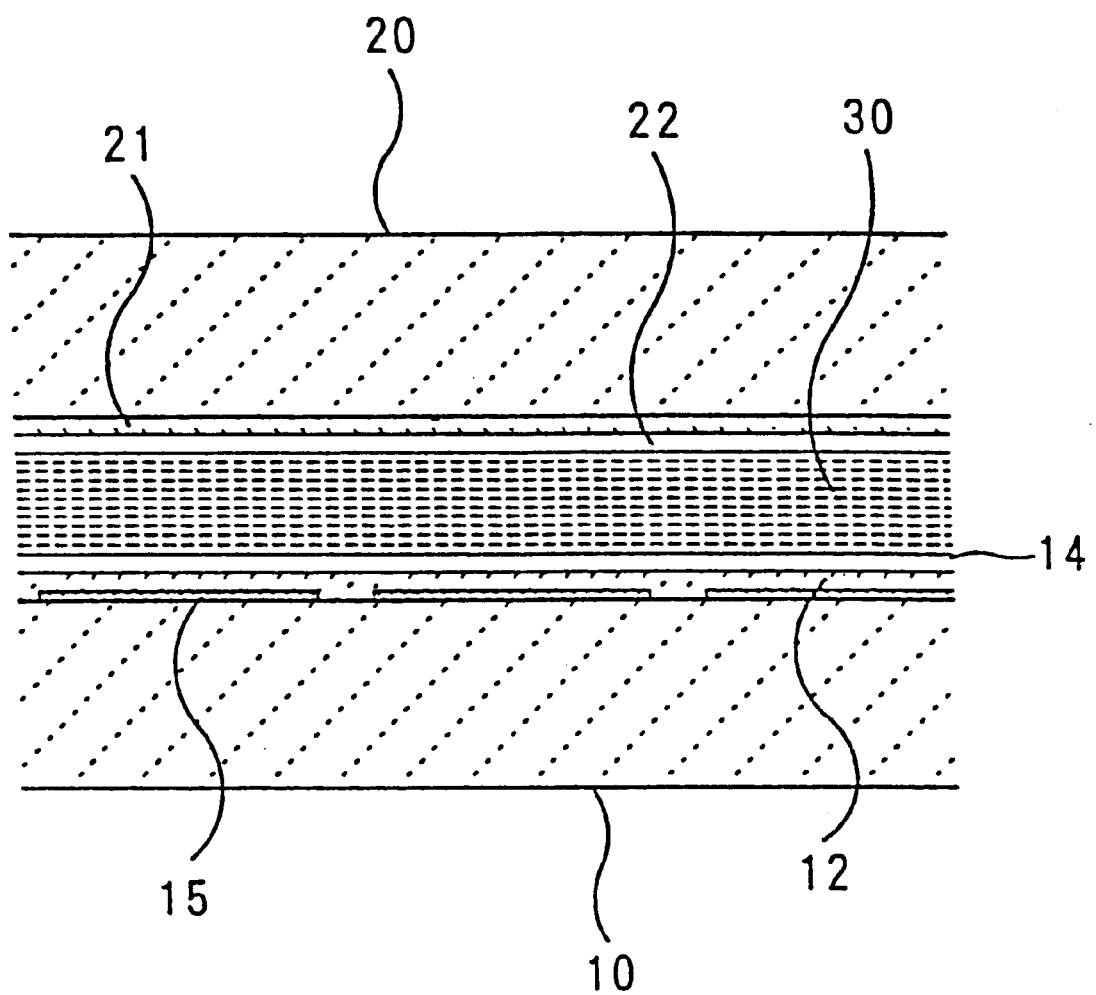
FIG. 5 is a longitudinal sectional view illustrating the structure of a variant of the embodiment.

FIG. 5 illustrates a variant of the foregoing embodiment which has a configuration in which the reflecting layer 11 and the transparent electrode 13 in the above embodiment are integrated. That is, a reflective electrode 15 made of a reflection property such as aluminum and chromium is formed on the substrate.

In this embodiment, the manufacturing process and the cell structure can be simplified although basic operations are the same as in the preceding embodiment.

In this embodiment, any of various liquid crystal molecule composite layers may be used as a liquid crystal layer 30. In other words, any of various liquid crystals having a specific orientation relative to electric field and refractive index anisotropy may be employed as a liquid crystal.

The structure of the liquid crystal molecule should preferably be similar to that of the polymer precursor, so that the polymer precipitated in the liquid crystal molecule has a refractive index almost equal to that of the liquid crystal molecule. By using a material having a similar structure, the liquid crystal molecules are arranged in substantially the same direction as the polymer, and can have almost the same refractive index as that of the polymer. Upon non-application of electric field (light absorbing state), therefore, it is possible to minimize light scattering caused by a slight shift of arrangement between the liquid crystal molecule and the polymer. It is also possible to accomplish absorption by the dichroic dye more effectively.

This is also the case with conditions for the polymer. The polymer particles must be arranged in the same direction as the liquid crystal molecule. The polymer should have substantially the same refractive index as that of the liquid crystal.

As a material for achieving such a configuration, for example, a material having a structure in which a polymer main chain has a side chain having a biphenyl skeleton may be used in the present invention. Among materials having a side chain with a biphenyl skeleton, thermoplastic polymers, thermosetting polymers, and photo-setting polymers provided with photo-setting property relative to ultraviolet rays and the like are particularly useful.

When forming a composite layer, in which polymer and liquid crystal are separated from each other, by dissolving the polymer precursor and the liquid crystal and then polymerizing the thus prepared solution, applicable polymer precursors include ester methacrylate or ester acrylate of biphenylmethanol and terphenylmethanol, and derivatives of these compounds. It is also possible to use a material prepared by mixing these ester methacrylate derivatives or ester acrylate derivatives of biphenyl or terphenylmethanol with these esters.

A polymer precursor of which the polymer is oriented in the same direction as the liquid crystal molecule upon non-application of electric field must be employed. Effective light scattering cannot be achieved unless the polymer particle size is within a range of from 0.1 to 10 μm. It is therefore necessary to separate the liquid crystal molecule from the polymer in accordance with these conditions.

To accomplish separation under these conditions, it is very important to adjust the manufacturing speed. In the liquid crystal apparatus, the degree of light absorption/light scattering represents the contrast ratio of the liquid crystal apparatus. The conditions should therefore be set so that the liquid crystal molecule and the polymer are arranged substantially in the same direction.

The optimum content of liquid crystal in the liquid crystal/polymer composite layer (liquid crystal layer) is within a range of from 50 to 97 wt. % of the entire liquid crystal layer for obtaining light scattering state. With a liquid crystal content of under this level, response to electric field becomes more difficult, making it impossible to obtain a light scattering state, thus leading to a lower contrast in the liquid crystal apparatus. A liquid crystal content of over 97 wt. %, on the other hand, leads to a larger content of polymer and a higher content of liquid crystal molecule on the contrary, resulting in a lower degree of light scattering. A liquid crystal apparatus having an optimum contrast ratio is therefore available by setting the liquid crystal content within this range.

In this embodiment also, color display is available by arranging a color filter on the substrate on the light incidence side. By providing a layer having an optical isotropy between the ¼ wavelength layer and the liquid crystal layer, orientation of the liquid crystal layer is stabilized.

As in the foregoing first and second embodiments, a display free from parallax is achievable by forming a ¼ wavelength layer on the reflecting layer, this in turn resulting in a liquid crystal apparatus giving improved contrast between display in the light absorbing side and that in the light scattering state. Because of the absence of the necessity of a polarizing plate, furthermore, it is possible to achieve a liquid crystal apparatus capable of giving a bright display.

In the first and second embodiments, as shown in FIG. 2, for example, the description has been based on a configuration in which the liquid crystal molecules were oriented in parallel. In the subsequent embodiments of the invention as well, a liquid crystal apparatus in which liquid crystal molecules are arranged in parallel may be employed.

A liquid crystal apparatus with the liquid crystal molecules in a twisted state is also applicable. In this case, the twist angle of the liquid crystal molecule and n of liquid crystal must be set so that the polarization direction of the light entering from the reflecting layer side via the retardation film (¼ wavelength layer) is absorbed by the dichroic dye in the liquid crystal layer.

Third Embodiment

Figure 6:
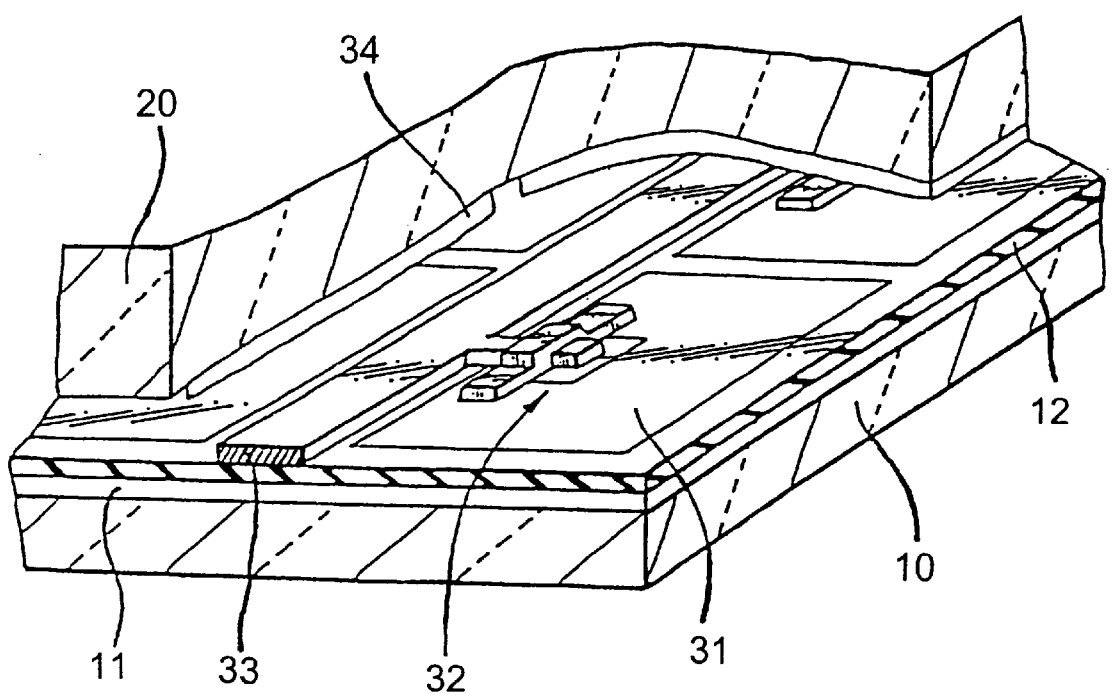
FIG. 6 illustrates the structure in which switching elements are arranged in the liquid crystal apparatus.

In the third embodiment of the invention, a switching element is provided on the substrate 10. FIG. 6 illustrates the configuration thereof.

A reflecting layer 11 is formed on the substrate 10, and a ¼ wavelength layer (12) is formed on the reflecting layer. A pixel electrode (31) formed into a matrix shape is formed on the ¼ wavelength layer. A switching element (32) is formed in connection with this pixel electrode. Applicable switching elements include a TFT and an MIM. In the present embodiment, an MIM (32) is used as the switching element (see FIG. 6).

An orientation film for causing orientation of the liquid crystal molecules is provided on the switch element and the pixel electrode. A known material is used for the orientation film. The orientation film is rubbing-treated.

A substrate 20 facing the substrate 10 has the following configuration.

When the switching element formed on the substrate 10 is an MIM, a stripe-shaped electrode 34 is formed on the surface of the substrate 20, the stripes being called scanning lines in general. The electrode 34 is formed in alignment with the arrangement of the pixel electrodes formed on the substrate 10. That is, the electrode 34 is formed in a direction at right angles to the direction of data lines (33) of the MIM element formed on the substrate 10.

When a TFT is formed on the substrate 10, the electrode on the substrate 20 is formed over the entire surface of the substrate. The electrode formed on the substrate 20 is transparent and is made of an ITO or the like.

When a TFT is formed on the substrate 10, the configuration of the switching element (TFT) must be modified so as to prevent the light from entering the switching element. Entrance of light may be prevented also by forming a black mask on the switching element. The black mask is formed on the switching element formed on the opposite substrate 10. The black mask may be provided at a position where it overlaps with the switching element of the opposite substrate 20. More preferably, a black mask should be formed so as to include the switching element.

In the present embodiment, the switching element is connected to each picture element, thus permitting control of orientation of the liquid crystal molecules in the liquid crystal layer for each picture element. A liquid crystal apparatus capable of giving a high-precision display is thus available.

Since the liquid crystal apparatus of the invention does not require a polarizing plate, there is achievable a liquid crystal apparatus giving a clear display.

Also in this embodiment, as well as in the subsequent embodiments, it is possible to perform color display by providing a color filter on the substrate on one side.

Fourth Embodiment

The fourth embodiment of the invention has a configuration built by improving the configuration of the third embodiment. More specifically, a reflecting layer and a pixel electrode formed on the substrate are integrated into one, which arranged on the substrate as a reflecting electrode. The configuration will be described below. The configuration of a liquid crystal layer and that of a substrate 20 being the same as in the preceding embodiments, description is omitted here.

A matrix-shaped pixel electrode (serving also as a reflecting electrode) is formed on the substrate 10. The pixel electrode is made of a material having a reflecting property such as aluminum and chromium. A switching element is connected to each pixel electrode, and voltage applied to the liquid crystal is controlled by the switching elements. A TFT or an MIM is used for the switching element as in the third embodiment.

The pixel electrode should preferably has a configuration in which the electrode has surface irregularities. In the case of a reflecting film forming a perfect mirror surface, an object facing the liquid crystal apparatus would be reflected onto the mirror surface. By forming a plurality of protuberances and projections per unit picture element, it is possible to prevent an unexpected image of a person from being reflected. This however relates to a case where the liquid crystal apparatus is used as a display unit. In the case of a projector described later, it may be preferable to use a reflecting film having a mirror surface.

A ¼ wavelength plate is provided on the switching element and the pixel electrode, and an orientation film is formed on this ¼ wavelength plate. To ensure flatness of the surface on the liquid crystal layer side, a film having an optical isotropy may be arranged on the substrate having the switching element and the pixel electrode formed thereon. In this case, a ¼ wavelength layer is formed on the isotropic film in this configuration. A film having an optical isotropy may be formed on the ¼ wavelength layer. This is to flatten the surface to come into contact with the liquid crystal layer.

In this embodiment, it is not necessary to separately form the reflecting electrode and the pixel electrode as in the third embodiment, because the pixel electrode is made of a material having a reflecting property, thus enabling to reduce the manufacturing process. Since the ¼ wavelength layer serving also as a retardation film is provided on the pixel electrode, a liquid crystal apparatus free from parallax is available.

In this embodiment, it is possible to form a switching element on a semiconductor substrate by the utilization of the semiconductor technology, and adopt a configuration in which the pixel electrode is formed on the switching element. Since the pixel electrode is formed by the use of the semiconductor technology, more picture elements can be formed and each picture element can be made at a higher precision. When applying the liquid crystal apparatus for a projector described later, the liquid crystal apparatus ca be used as a liquid crystal light valve. By the utilization of the semiconductor technology, it is possible to reduce the panel size of the liquid crystal light valve, project a highly precise image, and downsize the projector.

Further, because it is not necessary to provide a black mask on the switching element, there is no lattice caused by the black mask, and there is available a display free from a decrease in contrast usually caused by the black mask.

Moreover, it is possible to perform color display by arranging a color filter on the substrate 20.

Fifth Embodiment

This embodiment of the invention has a configuration in which a switching element is formed on the substrate on the light incidence side. The configuration will be described below.

A pixel electrode in a matrix shape is provided on the inner surface of the substrate 20 on a light incidence side. This pixel electrode is made of a transparent material, and can be made, for example, of ITO. A switching element is connected to each of the pixel electrodes. As described above, the switching a TFT or an MIM can be used for the switching element.

A known orientation film is formed on the pixel electrode and the switching element, and the surface of the orientation film is rubbing-treated so as ensure orientation of the liquid crystal molecules and the polymer particles in a prescribed direction.

The substrate having a reflecting layer formed thereon has, on the other hand, the same configuration as in the first and second embodiment. That is, a reflecting layer 11 is formed on the substrate 10. The reflecting layer is formed over the entire surface of the substrate. There is no problem only if the reflecting layer is formed at least on the portion corresponding to the display region formed by the pixel electrode. A ¼ wavelength layer 12 is formed on this reflecting layer, and a transparent electrode 13 (for example, ITO) is formed over the entire surface of the ¼ wavelength layer. An orientation film 14 is formed on the electrode. As in the orientation film formed on the substrate 20, this orientation film is rubbing-treated as well so as to control orientation of the liquid crystal layer (liquid crystal molecule, dichroic dye and polymer). When the switching element comprises an MIM, the transparent electrode is patterned into a prescribed shape.

This switching element controls the direction of orientation of the liquid crystal and the dichroic dye in the liquid crystal layer, and the light absorbing state and the light scattering state. A light shielding film is formed, corresponding to the region having the switching element formed therein, on the substrate 20 so as to prevent an erroneous operation of the switching element which may be caused by the entrance of as light.

As in the foregoing second embodiment, the reflecting layer 11 and the transparent electrode 13 may be integrated into one on the substrate 10 (see FIG. 5). In this case, the electrode formed on the substrate is made of a material having the reflecting property, such as aluminum and chromium. The ¼ wavelength layer is formed on the electrode, and the orientation film is formed on the 1.4 wavelength film.

Sixth Embodiment

In this sixth embodiment of the invention, an example in which the liquid crystal apparatus of any of the first to fifth embodiments is mounted on an electronic equipment will be described.

FIG. 7 is a schematic plan view illustrating important parts of a projector (projector type display unit) using the reflection type liquid crystal apparatus of the first to fifth embodiments as a light valve.

FIG. 7 is a sectional view on the XZ plane passing through the center of an optical element 130. The projector in this example comprises a light source section 110 arranged along the system optical axis L, an integrator lens 120, a polarizing illuminator 100 substantially comprising a polarization converting element 130, polarization beam splitter 200 which causes an S-polarization luminous flux reflecting surface 201 to reflect an S-polarization luminous flux emitted from the polarizing illuminator 100, a dichroic mirror 412 which separates the blue color light (B) from the light reflected from the S-polarization reflecting surface 201 of the polarization beam splitter, a reflection type liquid crystal light valve 300B which modulates the separated blue color light (B), a dichroic mirror 413 which causes reflection and separation of the red color light (R) component of the luminous flux separated from the blue color light, a reflection type liquid crystal light valve 300R which modulates the thus separated red color light (R), a reflection type liquid crystal light valve 300G which modulates the remaining green color light (G) passing through the dichroic mirror 413, and a projecting optical system 500 comprising a projecting lens, which synthesizes the beams of light modulated as the three reflection type liquid crystal light valves 300R, 300G and 300B in the dichroic mirror 412 and 413 and the polarization beam splitter 200 and projects the synthesized light onto a screen 600. Above-mentioned respective liquid crystal panels (liquid crystal apparatuses) are used for the three reflection type liquid crystal light valves 300R, 300G and 300B.

A random polarization luminous flux emitted from the light source section 110 is divided by an integrator lens 120 into a plurality of intermediate fluxes, converted into a single polarization luminous flux (S-polarization luminous flux) having almost equal polarization directions by the polarization converter element 130 having a second integrator lens on the light incidence side, and arrives at the polarization beam splitter 200. The S-polarization luminous flux emitted from the polarization converter element 130 is reflected on the S-polarization luminous flux reflecting surface 201 of the polarization beam splitter 200. Of the reflected luminous flux, the blue color light (B) flux is reflected on the blue light reflecting layer of the dichroic mirror 412, and modulated by the reflection type liquid crystal light valve 300B. Of the luminous flux having passed through the blue light reflecting layer of the dichroic mirror 411, the red light (R) flux is reflected on the red light reflecting layer of the dichroic mirror 413, and modulated by the reflection type liquid crystal light valve 300R.

The green light (G) flux having passed through the red light reflecting layer of the dichroic mirror 413 is modulated by the reflection type liquid crystal light valve 300G.

In this embodiment, a liquid crystal panel using a semiconductor substrate as described in the fourth embodiment should preferably be adopted, as compared with an active matrix type liquid crystal panel forming a TFT array on a glass substrate, as a reflection type liquid crystal panel (the liquid crystal apparatus in the preceding embodiment is adopted).

More specifically, according to the configuration shown in the fourth embodiment, picture elements are formed by the use of the semiconductor technology. It is therefore possible to form more picture elements and downsize the panel. This results in effects of projecting a highly precise image and reduce the size of the projector.

Seventh Embodiment

Figure 8A:
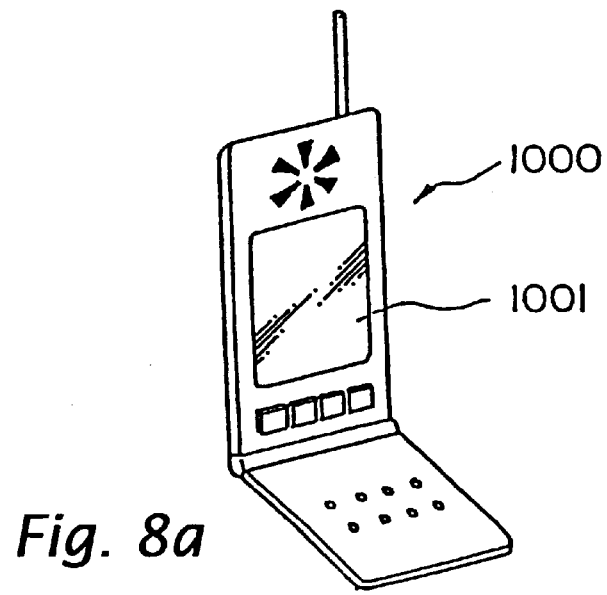
FIG. 8 illustrates the configuration of another electronic equipment mounting the liquid crystal apparatus.
Figure 8B:
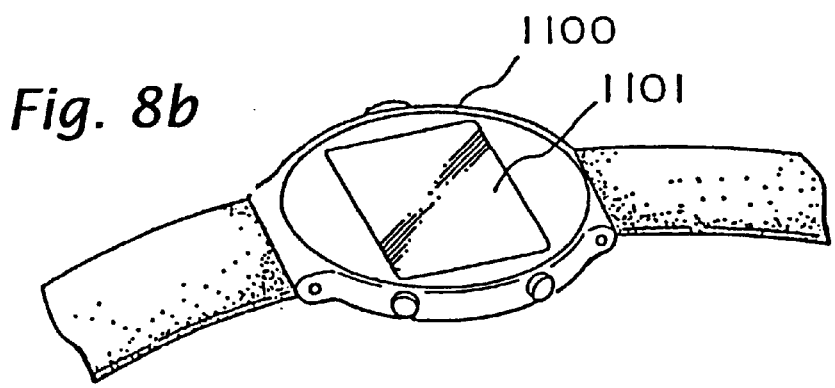
Figure 8C:
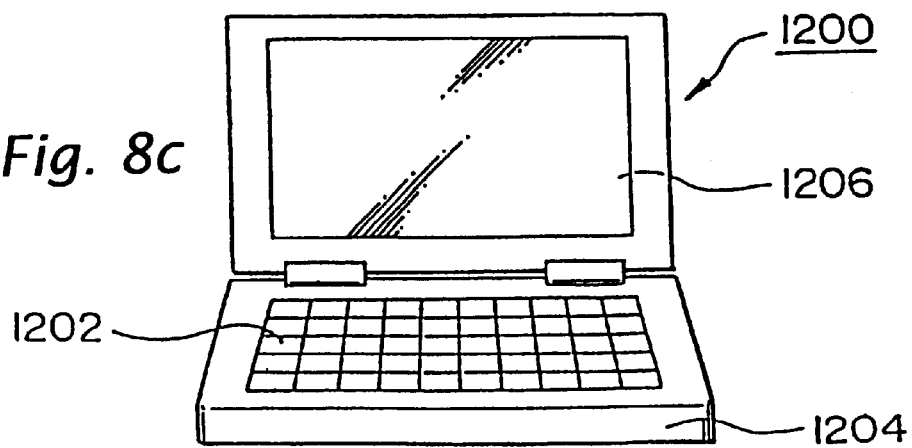

Now, FIG. 8 is an exterior view of examples of electronic equipment using the reflection type liquid crystal display unit shown in the preceding embodiment. In these electronic devices, the liquid crystal apparatus is used, not as a light valve used together with a polarization beam splitter, but as a direct-vision reflection type liquid crystal display unit (liquid crystal panel). The reflecting electrode is not therefore required to be a perfect mirror surface, but in order to widen the visual field angle, it is desirable to provide appropriate recesses and projections. All the other requirements are basically the same as in the case of light valve.

FIG. 8(*a*) is a perspective view illustrating a portable telephone set. In FIG. 8(*a*), 1000 is a portable telephone set main body, and 1001 is a display section using the reflection type liquid crystal display unit (liquid crystal panel) of the invention. Because the liquid crystal apparatus of the invention is of the reflection type, it is not necessary to use a back light. Since a member of a large power consumption such as the back light is not used, a liquid crystal apparatus of a low power consumption is therefore available. In other words, by mounting the liquid crystal apparatus of such a low power consumption as a display unit on the display section of a portable telephone set, it is not necessary to use a larger capacity of a battery mounted on the portable telephone set.

FIG. 8(*b*) illustrates a watch type electronic device: 1100 is a perspective view of a watch main body, and 1101 is a display section using the reflection type liquid crystal apparatus (liquid crystal panel) of the invention.

Because this liquid crystal apparatus has high-precision picture elements as compared with a conventional watch display section, it is possible to permit TV image display, thus enabling to achieve a watch type TV.

FIG. 8(*c*) illustrates a portable type information processor such as a word processor or a personal computer: 1200 is an information processor; 1202 is an input section such as a keyboard; 1206 is a display unit using the reflection type liquid crystal apparatus of the invention; and 1204 is an information processor main body. As the input section 1202, a touch panel may be adopted by arranging a display unit and touch keys.

As each of these electronic devices is driven by a battery, the service life of the battery can be extended by using the reflection type liquid crystal apparatus not having a light source lamp. Because peripheral circuits can be built in the panel substrate, it is possible to large reduce the number of parts, leading to a lighter and smaller device.

What is claimed is:

1. A liquid crystal apparatus comprising:
   a liquid crystal layer including a liquid crystal molecule with a first refractive index, a polymer with a second refractive index and a dichroic dye, said liquid crystal layer being held between a pair of substrates; and
   a reflecting layer with a mirror surface formed over one of said substrates on an inboard side having the liquid crystal layer formed thereon;
   a ¼ wavelength layer formed over the reflective layer, the ¼ wavelength layer converting an incident light reflected at the reflecting layer to a light having a predetermined polarization component, wherein said first and second refractive indexes are substantially the same upon voltage non-application and are different upon voltage application;
   an electrode formed over the ¼ wavelength layer;
   wherein, upon voltage non-application:
      said liquid crystal molecule, said dichroic dye and said polymer are arranged in a same direction different from a direction of the electric field to be applied;
      said liquid crystal layer not scattering the incident light or the light having the predetermined polarization component; and
      said dichroic dye absorbing the incident light and the light having the predetermined polarization component; and
   wherein, upon voltage application:
      only said liquid crystal molecule and said dichroic dye are selectively arranged in the electric field direction;
      said liquid crystal layer scattering said incident light and said light having the predetermined polarization component.

2. A liquid crystal apparatus according to claim 1, wherein another electrode is formed on the other substrate.

3. A liquid crystal apparatus according to claim 1, wherein:
   upon non-application of voltage, said liquid crystal molecule, said polymer and said dichroic dye are arranged in substantially the same direction, and said liquid crystal apparatus in a light absorbing state; and
   upon application of voltage, said liquid crystal molecule and said dichroic dye are arranged in an electric field direction, and said liquid crystal apparatus is in a light scattering state.

4. The liquid crystal apparatus of claim 1 wherein the ¼ wavelength layer further comprises a light-oriented polymer layer.

5. The liquid crystal apparatus of claim 1 wherein the ¼ wavelength layer further comprises one of a first layer containing an oriented polymer compound exhibiting a thermotropic liquid crystal property, a second layer containing an oriented liquid crystal monomer set by ultraviolet irradiation, and a third layer having an inorganic transparent oxide film deposited by oblique vapor deposition.

6. A liquid crystal apparatus comprising:
a liquid crystal layer including a liquid crystal molecule with a first refractive index, a polymer with a second refractive index and a dichroic dye, said liquid crystal layer being held between a pair of substrates; and
a reflecting layer with a mirror surface formed over one of said substrates on an inboard side having the liquid crystal layer formed thereon;
a ¼ wavelength layer formed over the reflecting layer, the ¼ wavelength layer converting an incident light reflected at the reflecting layer to a light having a predetermined polarization component;
an electrode formed over said ¼ wavelength layer, wherein said first and second refractive indexes are substantially the same upon voltage non-application and are different upon voltage application;
wherein, upon voltage non-application:
said liquid crystal molecule, said dichroic dye and said polymer are arranged in a same direction different from a direction of the electric field to be applied;
said liquid crystal layer not scattering the incident light or the light having the predetermined polarization component; and
said dichroic dye absorbing the incident light and the light having the predetermined polarization component; and
wherein, upon voltage application:
only said liquid crystal molecule and said dichroic dye are selectively arranged in the electric field direction;
said liquid crystal layer scattering said incident light and said light having the predetermined polarization component.

7. A liquid crystal apparatus according to claim 6, wherein a pixel electrode formed in a matrix shape and a switching element connected to said pixel electrode are formed on said retardation film.

8. A liquid crystal apparatus according to claim 6, wherein an optical isotropic layer not exerting an optical action is formed between said retardation film and said liquid crystal layer.

9. A liquid crystal apparatus according to claim 6, wherein a color filter comprising a plurality of color elements is formed on said other substrate at a position opposite to said pixel electrode.

10. A liquid crystal apparatus comprising:
a liquid crystal layer including a liquid crystal molecule, a polymer and a dichroic dye, said liquid crystal layer being held between a pair of substrates;
an electrode having a mirror surface formed over one of said substrates on an inboard side having the liquid crystal layer formed thereon; and
a retardation film formed over said electrode, wherein said liquid crystal layer does not cause scattering upon voltage non-application, and causes scattering upon voltage application,
wherein upon voltage non-application said liquid crystal molecule, said dichroic dye and said polymer are arranged in a same direction different from a direction of the electric field to be applied; and
wherein upon voltage application only said liquid crystal molecule and said dichroic are selectively arranged in the electric field direction.

11. A liquid crystal apparatus according to claim 10, wherein:
said electrode comprises a plurality of pixel electrode arranged in a matrix shape, and a switching element is formed in connection with said pixel electrodes.

12. A liquid crystal apparatus according to claim 10, wherein:
said other substrate has a color filter comprising a plurality of color, elements formed thereon.

13. A liquid crystal apparatus comprising:
a light incident side substrate having a pixel electrode formed in a matrix shape and a switching element connected to said pixel electrode;
an opposite substrate having a reflecting layer with a mirror surface formed on an inboard side having the liquid crystal layer formed thereon;
a ¼ wavelength layer formed over the reflecting layer, the ¼ wavelength layer converting an incident light reflected at the reflecting layer to a light having a predetermined polarization component;
an electrode formed over the ¼ wavelength layer;
a liquid crystal layer disposed between said substrates; and
said liquid crystal layer comprising a liquid crystal molecule with a first refractive index, a polymer with a second refractive index, and a dichroic dye, wherein said first and second refractive indexes are substantially the same upon voltage non-application and are different upon voltage application;
wherein, upon voltage non-application:
said liquid crystal molecule, said dichroic dye and said polymer are arranged in a same direction different from a direction of the electric field to be applied;
said liquid crystal layer not scattering the incident light or the light having the predetermined polarization component; and
said dichroic dye absorbing the incident light and the light having the predetermined polarization component; and
wherein, upon voltage application:
only said liquid crystal molecule and said dichroic dye are selectively arranged in the electric field direction;
said liquid crystal layer scattering said incident light and said light having the predetermined polarization component.

14. An electronic device including a light valve comprising:
a light incident side substrate having a pixel electrode formed in a matrix shape and a switching element connected to said pixel electrode;
an opposite substrate having a reflecting layer with a mirror surface formed on an inboard side having the liquid crystal layer formed thereon;
a ¼ wavelength layer formed over the reflecting layer, the ¼ wavelength layer converting an incident light reflected at the reflecting layer to a light having a predetermined polarization component;
an electrode formed over the ¼ wavelength layer;
a liquid crystal layer disposed between said substrates; and said liquid crystal layer comprising a liquid crystal molecule with a first refractive index, a polymer with a second refractive index, and a dichroic dye, wherein said first and second refractive indexes are substantially the same upon voltage non-application and are different upon voltage application;

wherein, upon voltage non-application:
said liquid crystal molecule, said dichroic dye and said polymer are arranged in a same direction different from a direction of the electric field to be applied;
said liquid crystal layer not scattering the incident light or the light having the predetermined polarization component; and
said dichroic dye absorbing the incident light and the light having the predetermined polarization component; and wherein, upon voltage application:
only said liquid crystal molecule and said dichroic dye are selectively arranged in the electric field direction;
said liquid crystal layer scattering said incident light and said light having the predetermined polarization component.

15. An electronic device including a display unit comprising:
a light incident side substrate having a pixel electrode formed in a matrix shape and a switching element connected to said pixel electrode;
an opposite substrate having a reflecting layer with a mirror surface formed on an inboard side having the liquid crystal layer formed thereon;
a ¼ wavelength layer formed over the reflecting layer, the ¼ wavelength layer converting an incident light reflected at the reflecting layer to a light having a predetermined polarization component;
an electrode formed over the ¼ wavelength layer;
a liquid crystal layer disposed between said substrates; and
said liquid crystal layer comprising a liquid crystal molecule with a first refractive index, a polymer with a second refractive index, and a dichroic dye, wherein said first and second refractive indexes are substantially the same upon voltage non-application and are different upon voltage application;

wherein, upon voltage non-application:
said liquid crystal molecule, said dichroic dye and said polymer are arranged in a same direction different from a direction of the electric field to be applied;
said liquid crystal layer not scattering the incident light or the light having the predetermined polarization component; and
said dichroic dye absorbing the incident light and the light having the predetermined polarization component; and wherein, upon voltage application:
only said liquid crystal molecule and said dichroic dye are selectively arranged in the electric field direction;
said liquid crystal layer scattering said incident light and said light having the predetermined polarization component.

16. A liquid crystal apparatus comprising:
a first substrate having a first and second side;
a second substrate having a first and second side;
a reflecting layer with a mirror surface disposed over said second side of said first substrate;
a ¼ wavelength layer formed over said reflecting layer, the ¼ wavelength layer converting an incident light reflected at the reflecting layer to a light having a predetermined polarization component; and
a liquid crystal layer disposed between said electrode and said first side of said second substrate, said liquid crystal layer including a liquid crystal molecule with a first orientation, a polymer with a second orientation and a dichroic dye, wherein said first and second orientations are substantially the same upon voltage non-application and are different upon voltage application;

wherein, upon voltage non-application:
said liquid crystal molecule, said dichroic dye and said polymer are arranged in a same direction different from a direction of the electric field to be applied;
said liquid crystal layer not scattering the incident light or the light having the predetermined polarization component; and
said dichroic dye absorbing the incident light and the light having the predetermined polarization component; and wherein, upon voltage application:
only said liquid crystal molecule and said dichroic dye are selectively arranged in the electric field direction;
said liquid crystal layer scattering said incident light and said light having the predetermined polarization component.

17. The liquid crystal apparatus of claim 16 further comprising an electrode formed on said ¼ wavelength layer.

18. The liquid crystal apparatus of claim 17 wherein said electrode further comprises a picture element electrode formed in a matrix shape.

19. The liquid crystal apparatus of claim 18 further comprising a switching element connected to said pixel electrode.

20. The liquid crystal apparatus of claim 18 further comprising a color filter including a plurality of color elements formed on said first side of said second substrate opposite said pixel electrode.

21. The liquid crystal apparatus claim 16 further comprising an optical isotropic layer disposed between said retardation film and said liquid crystal layer.

22. The liquid crystal apparatus of claim 16 wherein the ¼ wavelength layer further comprises a light-oriented polymer layer.

23. The liquid crystal apparatus of claim 16 wherein the ¼ wavelength layer further comprises one of a first layer containing an oriented polymer compound exhibiting a thermotropic liquid crystal property, a second layer containing an oriented liquid crystal monomer set by ultraviolet irradiation, and a third layer having an inorganic transparent oxide film deposited by oblique vapor deposition.

24. A liquid crystal apparatus comprising:
a first substrate having a first and second side;
a second substrate having a first and second side;
a reflecting layer with a mirror surface disposed over said second side of said first substrate;
a ¼ wavelength layer disposed over said reflecting layer;
a picture element electrode formed into a matrix shape and disposed over said ¼ wavelength layer;
a switching element connected to said picture element electrode;

a striped shaped electrode disposed over said second side of said second substrate in a direction generally perpendicular to the direction of data lines of said switching element; and a liquid crystal layer disposed between said switching element and said striped shaped electrode, said liquid crystal layer including a plurality of liquid crystal molecules with a first orientation, a plurality of polymers with a second orientation and a dichroic dye, wherein said first and second orientations are substantially the same upon voltage non-application and are different upon voltage application;

wherein, upon voltage non-application:
   said liquid crystal molecule, said dichroic dye and said polymer are arranged in a same direction different from a direction of the electric field to be applied;
   said liquid crystal layer not scattering the incident light or the light having the predetermined polarization component; and
   said dichroic dye absorbing the incident light and the light having the predetermined polarization component; and wherein, upon voltage application:
   only said liquid crystal molecule and said dichroic dye are selectively arranged in the electric field direction;
   said liquid crystal layer scattering said incident light and said light having the predetermined polarization component.

* * * * *

UNITED STATES PATENT AND TRADEMARK OFFICE
CERTIFICATE OF CORRECTION

PATENT NO. : 6,606,138 B2
DATED : August 12, 2003
INVENTOR(S) : Tomio Sonehara

It is certified that error appears in the above-identified patent and that said Letters Patent is hereby corrected as shown below:

Column 1,
Line 55, delete "a"
Line 61, "an" should be -- and --
Line 63, delete "on one of the substrates on the such"

Column 2,
Line 33, delete "in" and insert -- and -- therefor
Line 50, delete "it"

Column 3,
Line 22, delete "picture element" and insert -- pixel -- therefor
Line 23, delete "picture element" and insert -- pixel -- therefor Column 5,
Line 34, "48C" should be -- 48° C --
Line 48, "45" should be -- 45° --

Column 6,
Line 45, "100C" should be -- 100°C --

Column 7,
Line 19, delete "in"
Line 55, "45" should be -- 45° --

Column 12,
Line 66, "has" should be -- have --

Column 13,
Line 37, "ca" should be -- can --
Line 59, delete "the switching"

Column 14,
Line 24, delete "as"

Column 16,
Line 20, delete "large" and substitute -- greatly --

UNITED STATES PATENT AND TRADEMARK OFFICE
CERTIFICATE OF CORRECTION

PATENT NO. : 6,606,138 B2
DATED : August 12, 2003
INVENTOR(S) : Tomio Sonehara

It is certified that error appears in the above-identified patent and that said Letters Patent is hereby corrected as shown below:

Column 17,
Line 31, "1.4" should be -- ¼ --

Column 18,
Line 4, after "dichroic" insert -- dye --

Column 20,
Line 43, after "apparatus" insert -- of --

Signed and Sealed this

Twenty-fifth Day of May, 2004

JON W. DUDAS
*Acting Director of the United States Patent and Trademark Office*